(12) United States Patent
Kim et al.

(10) Patent No.: US 8,420,250 B2
(45) Date of Patent: Apr. 16, 2013

(54) BATTERY MODULE AND BATTERY PACK INCLUDING THE SAME

(75) Inventors: Myung-Chul Kim, Suwon-si (KR); Tae-Yong Kim, Suwon-si (KR); Hyun-Ye Lee, Suwon-si (KR); Shi-Dong Park, Suwon-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 268 days.

(21) Appl. No.: 12/801,770

(22) Filed: Jun. 24, 2010

(65) Prior Publication Data

US 2011/0135992 A1   Jun. 9, 2011

(30) Foreign Application Priority Data

Dec. 4, 2009   (KR) .......................... 10-2009-0119911

(51) Int. Cl.
*H01M 2/10*   (2006.01)

(52) U.S. Cl.
USPC ......................................................... 429/151

(58) Field of Classification Search .................... 429/151
See application file for complete search history.

(56) References Cited

U.S. PATENT DOCUMENTS

| | | | |
|---|---|---|---|
| 6,312,851 B1 | 11/2001 | Fukuda et al. | |
| 2006/0083980 A1 | 4/2006 | Choo et al. | |
| 2009/0017367 A1 | 1/2009 | Marubayashi | |
| 2009/0111010 A1 | 4/2009 | Okada et al. | |
| 2009/0269657 A1* | 10/2009 | Mita et al. | 429/151 |

FOREIGN PATENT DOCUMENTS

| | | | |
|---|---|---|---|
| EP | 0962993 A1 * | 8/1999 | |
| EP | 0962993 A1 | 12/1999 | |
| JP | 11-121024 A | 4/1999 | |
| JP | 2001-236937 A | 8/2001 | |
| JP | 2004-227788 A | 8/2004 | |
| JP | 2006-120489 A | 5/2006 | |
| JP | 2008/091183 A | 4/2008 | |
| JP | 2009-021048 A | 1/2009 | |
| JP | 2009-110833 A | 5/2009 | |
| KR | 10 1999-0018295 A | 3/1999 | |
| KR | 10-0471174 B1 | 3/2005 | |
| KR | 10 2008-0010156 A | 1/2008 | |

OTHER PUBLICATIONS

European Search Report in EP 10179115.0-1227, dated Dec. 29, 2010 (Kim, et al.).
Japanese Office Action in JP 2010-180329, dated Oct. 23, 2012 (Kim, et al.).
Korean Notice of Allowance in KR 10-2009-0119911, dated Aug. 24, 2012 (Kim, et al.).

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A battery module and battery pack, the battery module including a pair of end plates facing each other; a plurality of battery units arranged in a first direction between the end plates; a first side plate extending along a first side of the plurality of battery units, the first side plate being coupled to the end plates; a second side plate extending along a second side of the plurality of battery units, the second side plate being coupled to the end plates and being disposed opposite to the first side plate; a first coupling member, the first coupling member coupling the end plates to the first side plate; and a second coupling member, the second coupling member coupling the end plates to the second side plate, wherein the first coupling member and the second coupling member are disposed in asymmetrical positions with respect to a central line of the end plates.

20 Claims, 6 Drawing Sheets

BATTERY MODULE AND BATTERY PACK INCLUDING THE SAME

BACKGROUND

1. Field

Embodiments relate to a battery module and a battery pack including the same.

2. Description of the Related Art

In general, a secondary battery is chargeable and dischargeable, unlike a primary battery that is not rechargeable. The secondary battery may be used as an energy source for, e.g., mobile devices, electric vehicles, hybrid vehicles, electric bicycles, uninterruptible power supplies (UPS), and the like. According to the type of applied external devices, the secondary battery may be used as a single battery or as a battery pack configured by grouping and electrically connecting a plurality of batteries.

A small mobile device, e.g., a mobile phone, may be operated by using an output and capacity of a single battery during a predetermined time. However, a vehicle, e.g., an electric vehicle or a hybrid vehicle, which demands, e.g., high power consumption, a long-term drive, and a high power drive, may use an output and capacity of a battery pack. In this regard, an output voltage or an output current of the battery pack may be increased according to a number of batteries included in the battery pack.

SUMMARY

Embodiments are directed to a battery module and a battery pack including the same, which represent advances over the related art.

It is a feature of an embodiment to provide a battery module and a battery pack for increasing an efficient use of space by being compactly mounted in a limited space.

At least one of the above and other features and advantages may be realized by providing a battery module including a pair of end plates facing each other; a plurality of battery units arranged in a first direction between the end plates; a first side plate extending along a first side of the plurality of battery units, the first side plate being coupled to the end plates; a second side plate extending along a second side of the plurality of battery units, the second side plate being coupled to the end plates and being disposed opposite to the first side plate; a first coupling member, the first coupling member coupling the end plates to the first side plate; and a second coupling member, the second coupling member coupling the end plates to the second side plate, wherein the first coupling member and the second coupling member are disposed in asymmetrical positions with respect to a central line of the end plates.

Each end plate may include a base plate disposed adjacent to the plurality of battery units; a first flange part, the first flange part being bent from a first side of the base plate in a direction away from the plurality of battery units; and a second flange part, the second flange part being bent from a second side of the base plate in a direction away from the plurality of battery units.

The first coupling member may couple the first flange part to the first side plate, and the second coupling member may couple the second flange part to the second side plate.

The battery module may further include a third coupling member further coupling the end plates and the first side plate together with the first coupling member; and a fourth coupling member further coupling the end plates and the second side plate together with the second coupling member.

The first and third coupling members and the second and fourth coupling members may be arranged in asymmetrical positions with respect to the central line of the end plates.

The first, second, third, and fourth coupling members may be arranged at first, second, third, and fourth heights that are different with respect to a third side perpendicular to the first and second sides.

The first and second coupling members may include a bolt and a nut, and may couple the end plates and the side plates with the bolt and the nut.

The battery module may further include an upper plate extending along a third side of the plurality of battery units, the upper plate being coupled to the pair of end plates; and a lower plate extending along a fourth side of the plurality of battery units, the lower plate being coupled to the pair of end plates.

At least one of the above and other features and advantages may also be realized by providing a battery pack including a plurality of battery modules, each battery module including a pair of end plates facing each other; a plurality of battery units arranged in a first direction between the end plates; a first side plate extending along a first side of the plurality of battery units, the first side plate being coupled to the end plates; a second side plate extending along a second side of the plurality of battery units, the second side plate being coupled to the end plates and being disposed opposite to the first side plate; a first coupling member, the first coupling member coupling the end plates to the first side plate; and a second coupling member, the second coupling member coupling the end plates to the second side plate, wherein the first coupling member and the second coupling member are disposed in asymmetrical positions with respect to a central line of the end plates.

Each end plate may include a base plate disposed adjacent to the plurality of battery units; a first flange part, the first flange part being bent from a first side of the base plate in a direction away from the plurality of battery units; and a second flange part, the second flange part being bent from a second side of the base plate in a direction away from the plurality of battery units.

The first coupling member may couple the first flange part to the first side plate, and the second coupling member may couple the second flange part to the second side plate.

The battery pack may further include a third coupling member further coupling the end plates and the first side plate together with the first coupling member; and a fourth coupling member further coupling the end plates and the second side plate together with the second coupling member.

The first and third coupling members and the second and fourth coupling members may be arranged in asymmetrical positions with respect to the central line of the end plates.

The first, second, third, and fourth coupling members may be arranged at first, second, third, and fourth heights that are different with respect to a third side perpendicular to the first and second sides.

The first and second coupling members may include a bolt and a nut, and may couple the end plates and the side plates with the bolt and the nut.

The battery pack may further include an upper plate extending along a third side of the plurality of battery units, the upper plate being coupled to the pair of end plates; and a lower plate extending along a fourth side of the plurality of battery units, the lower plate being coupled to the pair of end plates.

The plurality of battery modules may be arranged in a second direction perpendicular to the first direction.

The plurality of battery modules arranged in the second direction may be disposed such that the first and second coupling members are adjacent to and offset from each other.

The plurality of battery modules may include one set of battery modules arranged in a second direction perpendicular to the first direction and a second set of battery modules arranged in a third direction perpendicular to the first and second directions.

The second set of battery modules arranged in the third direction may be disposed such that the first and second coupling members of respective battery modules adjacent to each other in the third direction are aligned.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
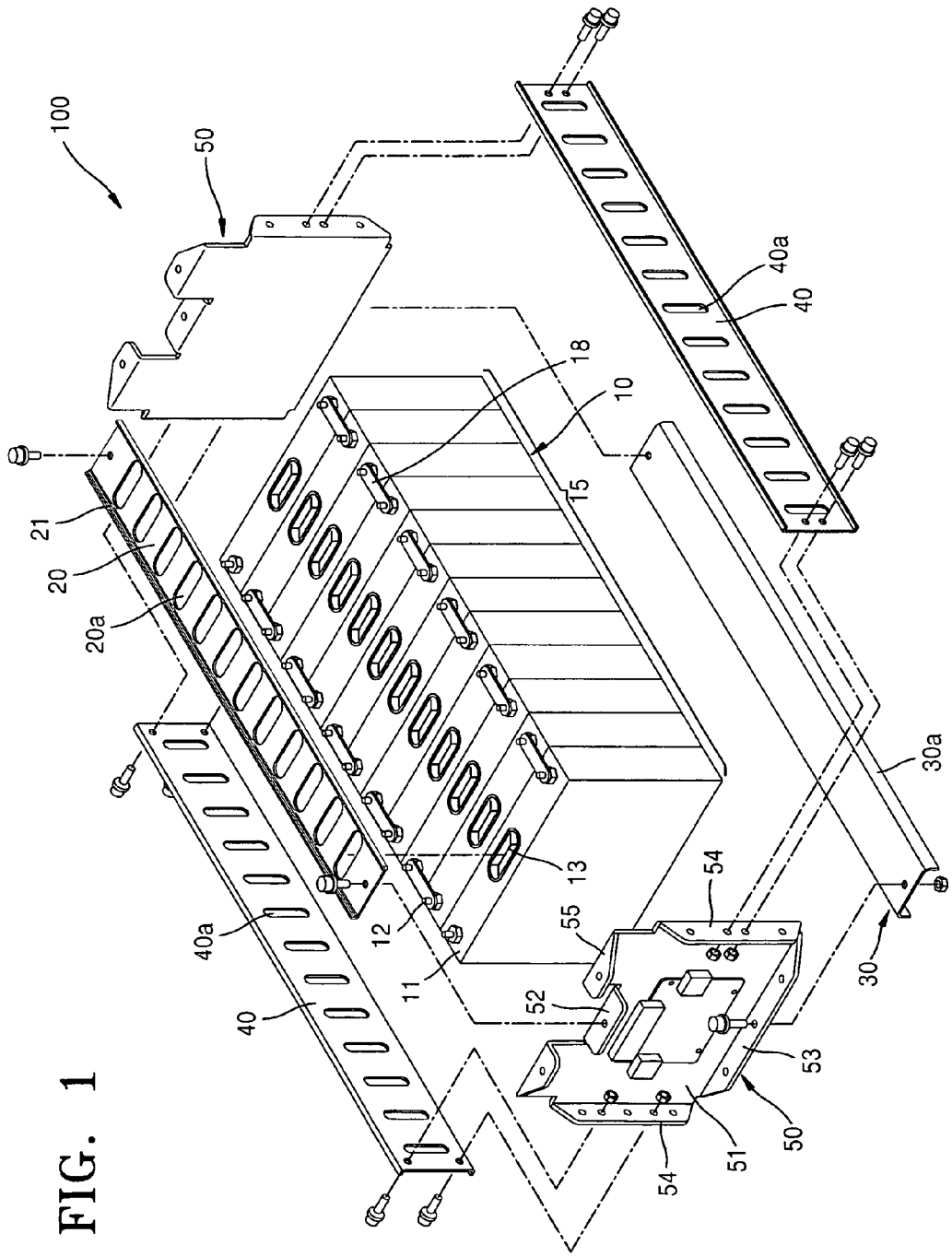
FIG. 1 illustrates an exploded perspective view of a battery module according to an embodiment.

Korean Patent Application No. 10-2009-0119911, filed on Dec. 14, 2009, in the Korean Intellectual Property Office, and entitled: "Battery Module and Battery Pack Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "between" two elements, it can be the only element between the two elements, or one or more intervening elements may also be present. Like reference numerals refer to like elements throughout.

Reference will now be made in detail to embodiments of a battery module and a battery pack, examples of which are illustrated in the accompanying drawings. Throughout the specification, the battery pack may be configured by including one or more battery modules and then by forming an electrical connection between the one or more battery modules, wherein each battery module may include a plurality of battery units arranged in a single direction.

Figure 2:
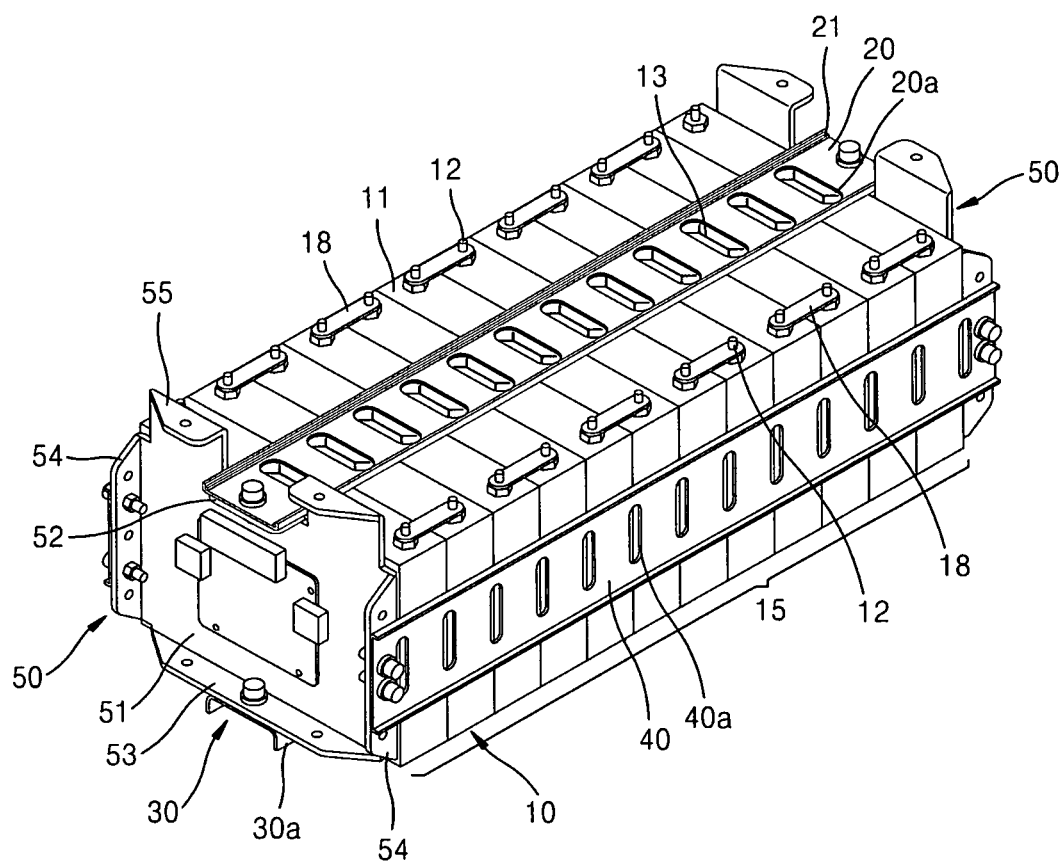
FIG. 2 illustrates a perspective view of an assembled state of the battery module of FIG. 1.

FIG. 1 illustrates an exploded perspective view of a battery module 100 according to an embodiment. FIG. 2 illustrates a perspective view of an assembled state of the battery module 100. Referring to FIGS. 1 and 2, the battery module 100 may include a plurality of battery units 10 that are arranged to form a battery array 15 and plates, e.g., an upper plate 20, a lower plate 30, side plates 40, and end plates 50, surrounding the battery array 15. The battery units 10 may be disposed in a single direction while forming the battery array 15, i.e., the battery module 100 may have a structure in which the battery units 10 are stacked to form battery arrays 15.

In an implementation, each battery unit 10 may include a secondary battery including, e.g., a lithium ion battery. However, the secondary battery may include various other types of secondary batteries, e.g., a cylindrical secondary battery, an angled secondary battery, or a polymer secondary battery, and thus the embodiments are not limited to one type of battery. Each battery unit 10 may include an electrode assembly (not illustrated), a case 11, and electrode terminals 12. The electrode assembly (not illustrated) may include a positive electrode (not illustrated), a separator (not illustrated), and a negative electrode (not illustrated), and may have, e.g., a wound structure or a stacked structure. The case 11 may accommodate the electrode assembly and each electrode terminal 12 may protrude from the case 11 to form an electrical connection between the electrode assembly and an external circuit. The battery units 10 may be electrically connected to each other, e.g., in parallel or in series, via a connection between the electrode terminals 12. In an implementation, the electrode terminals 12 may be connected to each other via bus bars 18. A safety vent 13 may be formed in the case 11. The safety vent 13 may be relatively less rigid than other parts of the case 11 and may vent a gas by being broken when an internal pressure exceeds a predetermined pressure in the case 11.

A pair of the end plates 50 may be disposed at ends of the battery array 15. One surface of each end plate 50 may be in close contact with a surface of the battery unit 10 at each end of the battery array 15. The pair of end plates 50 may group the battery units 15, thereby configuring the battery array 15 as one unit. Accordingly, the pair of end plates 50 may prevent deterioration of an electric characteristic of a battery by inhibiting volume expansion of the battery units 10 due to charging and discharging operations and by maintaining a resistance characteristic of the battery.

Each end plate 50 may include a base plate 51 and flange parts 52, 53, 54, and 55 bent from ends of the base plate 51. The base plate 51 may have an area that is sufficient to cover an external side surface of each battery unit 10 at the ends of the battery array 15.

The flange parts 52, 53, 54, and 55 may be bent from the ends of the base plate 51 in an inverse direction of, i.e., away from, the battery array 15. In an implementation, the flange parts 53 and 54 may be formed as one whole part, i.e., integrally formed, with the base plate 51, without being cut from the base plate 51 at left and right ends or a lower end of the base plate 51. In an implementation, the flange parts 52 and 55 may be separated from each other in such a manner that an upper end of the base plate 51 is cut and bent to form the flange parts 52 and 55 having different heights. The flange parts 52, 53, 54, and 55 may function as couplers for forming a coupling connection between the end plate 50 and another member and may vary in structure according to a connection state with the other member. Also, the flange parts 52, 53, 54, and 55 may reinforce mechanical rigidity of the end plate 50. A plurality of coupling holes may be formed in the flange parts 52, 53, 54, and 55.

The end plate 50 may be coupled to the opposing other end plate 50 via the side plates 40. The side plates 40 may couple the end plate 50 and the opposite other end plate 50 that form the pair. Each side plate 40 may extend along a side surface of the battery array 15 and may have two ends that are coupled to the end plate 50 and the opposite other end plate 50, respectively. Each side plate 40 may have a strip shape with a long axis extending in a single direction. Each side plate 40 may be coupled to each flange part 54 bent from the left and right ends of the end plate 50. In this regard, each side plate 40 and each flange part 54 may overlap to align respective coupling holes thereof. Each side plate 40 and each flange part 54 may then be coupled by coupling members including, e.g., a bolt and a nut. By doing so, each side plate 40 and each flange part 54 may form a surface contact by which each side plate 40 and each flange part 54 at least partly contact each other.

A plurality of heat emission holes 40a may be formed in each side plate 40. For example, the heat emission holes 40a may be formed in each side plate 40 at regular intervals in a longitudinal direction, i.e., along the long axis thereof. The heat emission holes 40a may allow contact between each battery unit 10 and outside air, thus rapidly dissipating heat generated in each battery unit 10.

The lower plate 30 may be disposed below the battery array 15. The lower plate 30 may extend along a bottom side of the battery array 15 and may be connected to lower portions of the pair of end plates 50. The lower plate 30 may have a strip shape with bent parts 30a that are bent in such a manner that ends of the bent parts 30a face each other, i.e., are bent away from the battery array 15. The lower plate 30 may physically support the battery module 100 including the battery array 15. Further, bending strength of the lower plate 30 may be reinforced by the bent parts 30a.

The lower plate 30 may be coupled to the flange part 53 that is bent from a lower end of the end plate 50. In this regard, the lower plate 30 and the flange part 53 may overlap to align respective coupling holes thereof and may then be coupled by coupling members including, e.g., a bolt and a nut. By doing so, the lower plate 30 and the flange part 53 may form a surface contact by which the lower plate 30 and the flange part 53 at least partly contact each other.

The upper plate 20 may be disposed above the battery array 15. The upper plate 20 may extend along a top side of the battery array 15 and may be connected to upper portions of the pair of end plates 50. The upper plate 20 may have a strip shape having bent parts 21 that are bent in such a manner that ends of the bent parts 21 may face each other, i.e., may be bent away from the battery array 15. The upper plate 20 may have openings 20a formed therein in a longitudinal direction thereof so as to allow the openings 20a to correspond to the safety vents 13 of the battery units 10. The upper plate 20 may be coupled to the flange part 52 that is bent from an upper end of the end plate 50. In this regard, the upper plate 20 and the flange part 52 may overlap to align respective coupling holes thereof and may then be coupled by coupling members including, e.g., a bolt and a nut. By doing so, the upper plate 20 and the flange part 52 may form a surface contact by which the upper plate 20 and the flange part 52 at least partly contact each other.

Figure 3:
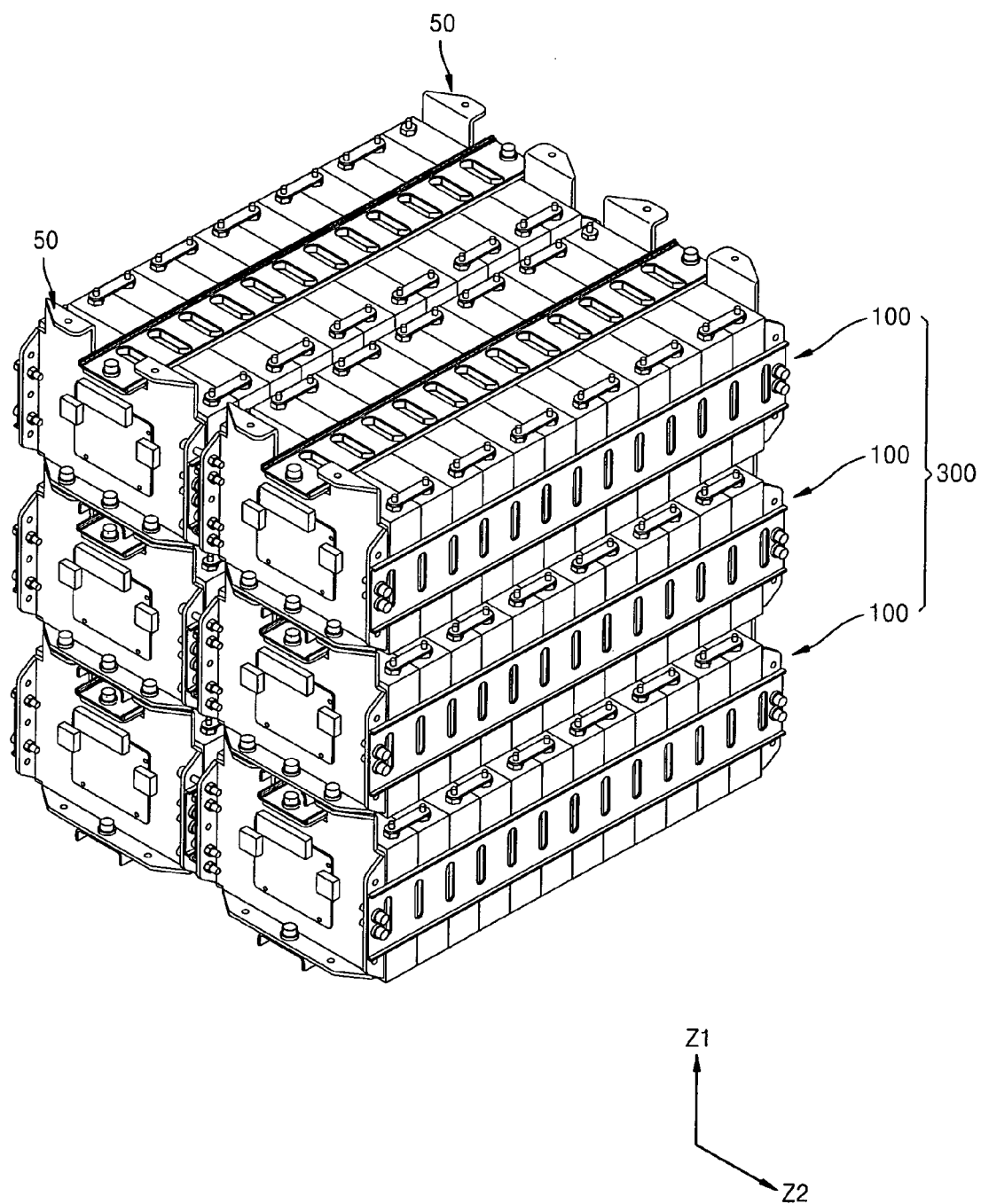
FIG. 3 illustrates a perspective view of a battery pack according to an embodiment configured by coupling the battery modules of FIG. 2.

FIG. 3 illustrates a perspective view of a battery pack 300 according to an embodiment formed by coupling the battery modules 100 of FIG. 2. Referring to FIG. 3, the battery pack 300 may include a collection of battery modules 100 formed in such a manner that the battery modules 100 are stacked in a vertical direction Z1 and a horizontal direction Z2. The number of battery modules 100 used to configure the battery pack 300 may be determined in consideration of a charge and discharge current and capacity as demanded in a design specification. The battery modules 100 used to form the battery pack 300 may form a mutual electrical connection or may be connected in series or in parallel.

Figure 4:
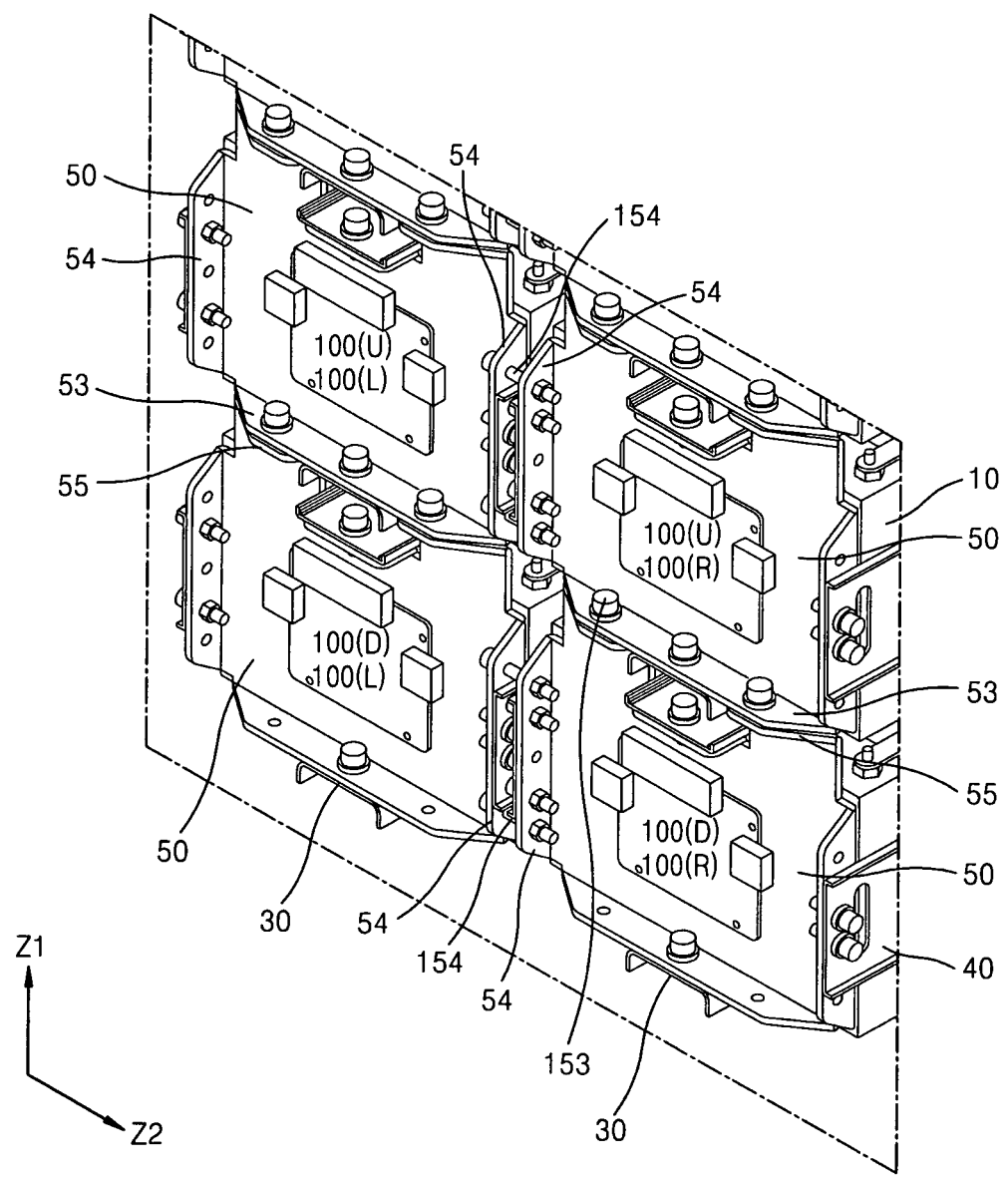
FIG. 4 illustrates a magnified view of an end plate of FIG. 3.

Coupling between adjacent battery modules 100 may be achieved by coupling the end plates 50 at external ends of the battery modules 100. FIG. 4 illustrates a magnified view of the end plates 50 of FIG. 3. In FIG. 4, letters U, D, L, and R that are written in parentheses together with reference numerals indicate relative positions of the battery modules 100 so as to indicate the battery modules 100 disposed at an upper side U, a lower side D, a left side L, and a right side R, respectively. For example, the battery module 100 disposed at an upper-left side may be indicated as the battery module 100(U) or 100(L).

Regarding coupling between the battery modules 100 that are disposed in the vertical direction Z1, the upper battery module 100(U) and the lower battery module 100(D) may be aligned and disposed with respect to each other in the vertical direction Z1. The lower flange part 53 of the upper battery module 100(U) may be disposed at a lower end of the upper battery module 100(U) and the upper flange part 55 of the lower battery module 100(D) may be disposed at an upper end of the lower battery module 100(D). The lower and upper flange parts 53 and 55 of the upper and lower battery modules 100(U) and 100(D) may overlap to align their respective coupling holes. Then, the upper and lower battery modules 100(U) and 100(D) may be coupled by using first coupling members 153 in the coupling holes, e.g., coupling between the upper and lower battery modules 100(U) and 100(D) may be achieved by inserting bolts into the coupling holes and then fastening the bolts with nuts. Here, the lower and upper flange parts 53 and 55 of the upper and lower battery modules 100(U) and 100(D) may form a surface contact by which the lower and upper flange parts 53 and 55 at least partly contact each other. Due to the surface contact between the lower and upper flange parts 53 and 55, the upper battery module 100(U) may be physically supported by the lower battery module 100(D).

Regarding coupling between the left and right battery modules 100(L) and 100(R) that are disposed in the horizontal direction Z2, e.g., the left battery module 100(L) and the right battery module 100(R) may be disposed in a same horizontal level. A pair of respective flange parts 54 facing each other may be disposed on a right end of the left battery module 100(L) and a left end of the right battery module 100(R). Here, the flange parts 54 of the left and right battery modules 100(L) and 100(R) may overlap to align their respective coupling holes. Then, the left and right battery modules 100(L) and 100(R) may be coupled by using second coupling members 154 in the coupling holes, e.g., coupling between the left and right battery modules 100(L) and 100(R) may be achieved by inserting bolts into the coupling holes and then fastening the bolts with nuts.

Figure 5:
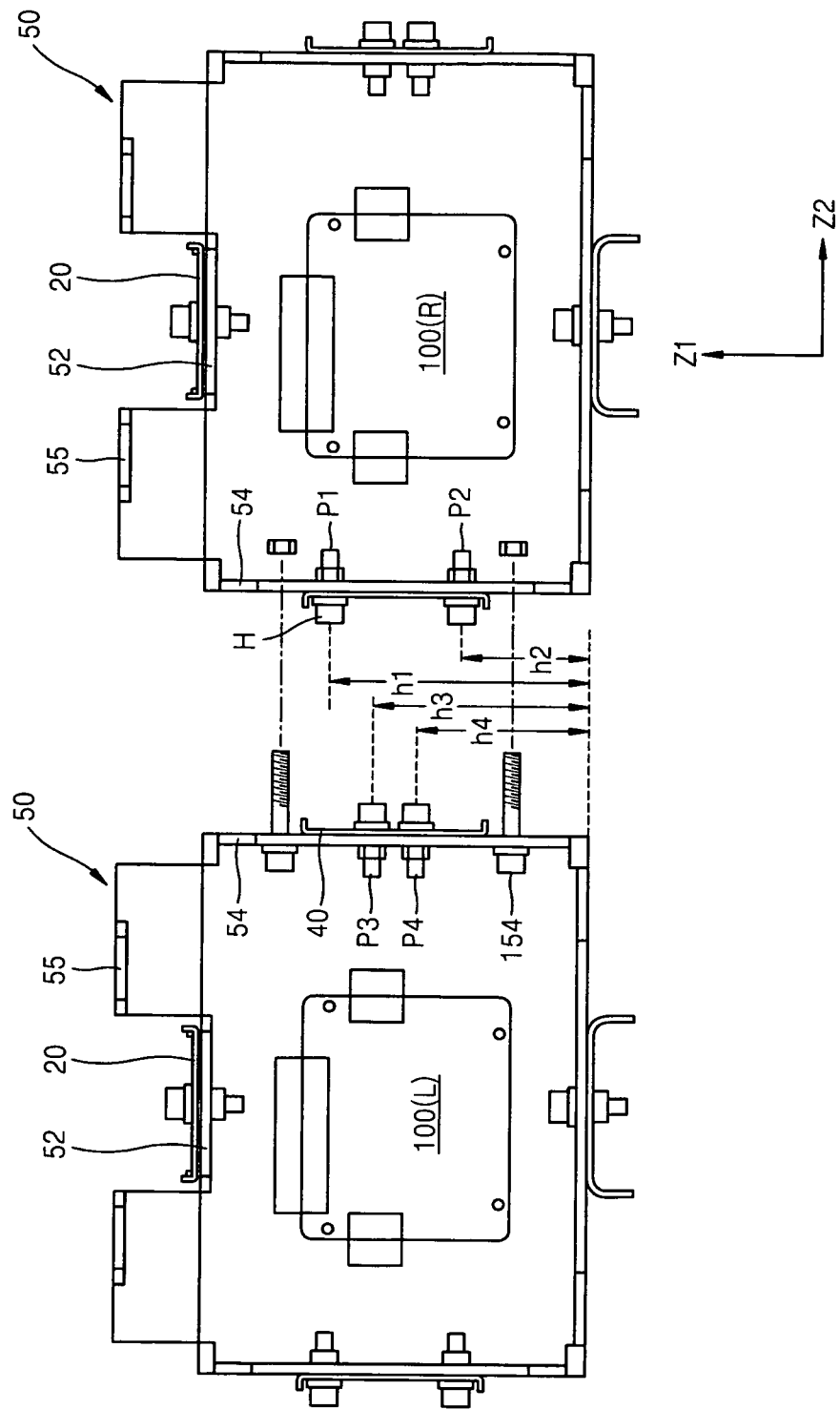
FIGS. 5 and 6 illustrate schematic views showing that the first through fourth coupling members between an end plate and a side plate are arranged in asymmetrical positions.

FIG. 5 illustrates a diagram of a coupling state of the left and right battery modules 100(L) and 100(R) disposed in a horizontal direction. Referring to FIG. 5, coupling members P1, P2, P3, and P4, e.g., bolts and nuts for fixing the side plates 40, may be coupled in flange parts 54 in the left and right battery modules 100(L) and 100(R) that face each other. For example, in a bolt-nut coupling method, a head portion H of a bolt may protrude toward the neighboring, i.e., adjacent, battery module 100. Here, the coupling members P1, P2, P3, and P4 of the left and right battery modules 100(L) and 100(R) may be designed to not overlap each other so that, when the left and right battery modules 100(L) and 100(R) are coupled to each other, interference between the coupling members P1, P2, P3, and P4 may not occur. In particular, the coupling members P1, P2, P3, and P4 may be disposed in different positions, e.g., at different heights h1, h2, h3, and h4, so that the neighboring battery modules 100 may be closely disposed and the battery modules 100 may be disposed in a limited space. By contrast, if the coupling members P1, P2, P3, and P4 of the neighboring battery modules 100 overlap, a gap at least twice as large as a thickness of the head portion H of the bolt may be necessary. Accordingly, the battery pack of an embodiment may be ideally suited for use in a smaller space.

By asymmetrically designing left and right sides of the battery modules 100, the coupling members P1, P2, P3, and P4 having protruding structures may be disposed in the different positions (e.g. at the different heights h1, h2, h3, and h4) without any interference with respect to each other so that a gap between the battery modules 100 may be minimized. Accordingly, the battery pack 300 may have a more compact structure.

In this manner, by coupling the end plates 50 of the battery modules 100 arranged in the vertical and horizontal directions Z1 and Z2, the battery modules 100 may be grouped as one battery pack 300. In an implementation, the end plates 50 may be coupled not only by mechanical coupling using bolts-nuts but also by welding.

Figure 6:
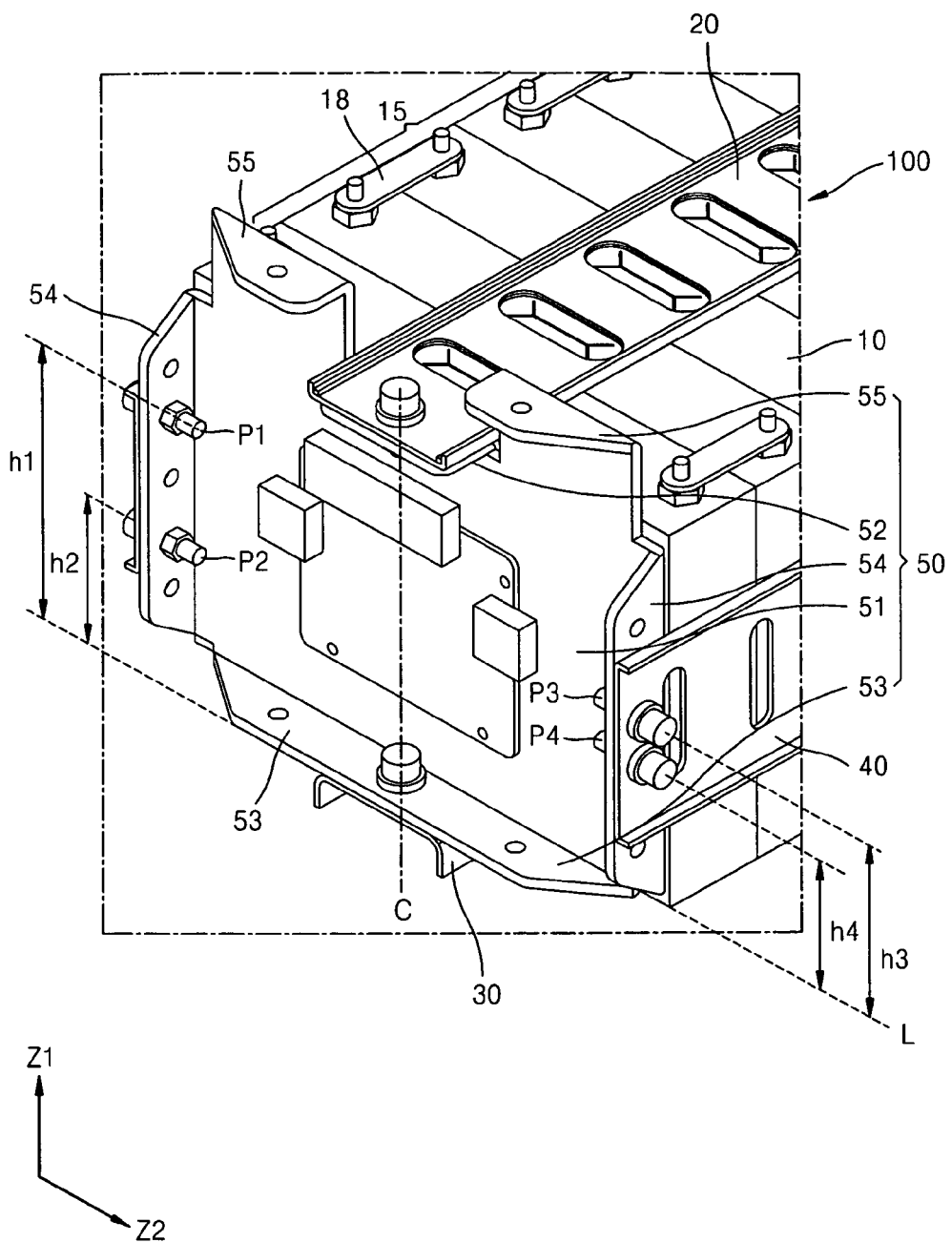

FIG. 6 illustrates a magnified view of the end plate 50 of the battery module 100. Referring to FIG. 6, the end plate 50 may include the base plate 51 and the flange parts 52, 53, 54, and 55, which may be bent from ends of the base plate 51. The flange parts 52, 53, 54, and 55 may include the upper-central flange part 52 that is bent from an upper portion of the base plate 51, the upper side flange part 55 adjacent to the upper-central flange part 52, the lower flange part 53 that is bent from a lower portion of the base plate 51, and the left and right flange parts 54 that are bent from left and right ends of the base plate 51.

The upper plate 20 may be coupled to the upper-central flange part 52. The upper plate 20 may extend along the top side of the battery array 15 and may be coupled to the upper-central flange part 52 of each of the end plates 50 that are disposed at both ends of the battery array 15. The lower plate 30 may be coupled to the lower flange part 53. The lower plate 30 may extend along the bottom side of the battery array 15 and may be coupled to the lower flange part 53 of each of the end plates 50 that are disposed at both ends of the battery array 15.

The coupling members P1, P2, P3, and P4 including, e.g., bolts and nuts, for fixing the side plates 40 may be coupled in the flange parts 54. The coupling members P1, P2, P3, and P4 arranged at left and right sides may be coupled in asymmetrical positions with respect to a central line C of the end plate 50, i.e., the coupling members P1, P2, P3, and P4 may be arranged at the different heights h1, h2, h3, and h4. For example, the first and second coupling members P1 and P2 to be coupled to the left flange part 54 may be disposed at outer sides along the vertical direction Z1 (i.e., heights h1 and h2); and the third and fourth coupling members P3 and P4 to be coupled to the right flange part 54 may be disposed at inner sides along the vertical direction Z1 (i.e., heights h3 and h4). Accordingly, the coupling members P1, P2, P3, and P4 may be arranged at the first through fourth heights h1, h2, h3, and h4 that are different from each other with respect to a reference line L. In an implementation, the battery modules 100 arranged in the second direction perpendicular to the first direction may be aligned such that the first coupling members of one of the battery modules 100 are adjacent to and offset from the second coupling members of an adjacent battery module 100 in the second direction. In an implementation, the battery modules 100 arranged in the third direction perpendicular to the first and second directions may be arranged such that the first and second coupling members of one of the battery modules 100 are aligned in the third direction with the first and second coupling members, respectively, of an adjacent battery module 100 in the third direction.

As described above, according to the embodiments, by asymmetrically designing coupling positions of the coupling members that protrude outside of the battery module, the battery pack configured by coupling the plurality of battery modules may be closely packed. Accordingly, external dimensions of the battery pack may be reduced so that the battery pack may be efficiently mounted in a limited space and space efficiency may be increased.

The battery pack of an embodiment may include the plurality of batteries in consideration of the output voltage or the output current and may be included in a small mounting space in a vehicle or the like due to increased mounting efficiency in consideration of space.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
a pair of end plates facing each other;
a plurality of battery units arranged in a first direction between the end plates;
a first side plate extending along a first side of the plurality of battery units, the first side plate being coupled to the end plates;
a second side plate extending along a second side of the plurality of battery units, the second side plate being coupled to the end plates and being disposed opposite to the first side plate; and
a plurality of coupling members, the plurality of coupling members coupling the side plates to at least one of the pair of end plates and including:
a first coupling member, the first coupling member coupling the one of the end plates to the first side plate; and
a second coupling member, the second coupling member coupling the one end plate to the second side plate,
wherein:
the first coupling member and the second coupling member are disposed in asymmetrical positions with respect to a central line of the one end plate, and
each coupling member that couples the one end plate to the first side plate is asymmetrically disposed about the central line of the one end plate with respect to every coupling member that couples the one end plate to the second side plate.

2. The battery module as claimed in claim 1, wherein each end plate includes:
a base plate disposed adjacent to the plurality of battery units;
a first flange part, the first flange part being bent from a first side of the base plate in a direction away from the plurality of battery units; and
a second flange part, the second flange part being bent from a second side of the base plate in a direction away from the plurality of battery units.

3. The battery module as claimed in claim 2, wherein:
the first coupling member couples the first flange part to the first side plate, and
the second coupling member couples the second flange part to the second side plate.

4. The battery module as claimed in claim 1, wherein the plurality of coupling members further includes:

a third coupling member further coupling the one end plate and the first side plate, together with the first coupling member; and a fourth coupling member further coupling the one end plate and the second side plate, together with the second coupling member.

5. The battery module as claimed in claim 4, wherein the first and third coupling members are arranged in asymmetrical positions about the central line of the one end plate with respect to the second and fourth coupling members.

6. The battery module as claimed in claim 5, wherein the first, second, third, and fourth coupling members are arranged at first, second, third, and fourth heights that are different with respect to a third side perpendicular to the first and second sides.

7. The battery module as claimed in claim 1, wherein the first and second coupling members:
include a bolt and a nut, and
couple the one end plate and the side plates with the bolt and the nut.

8. The battery module as claimed in claim 1, further comprising:
an upper plate extending along a third side of the plurality of battery units, the upper plate being coupled to the pair of end plates; and
a lower plate extending along a fourth side of the plurality of battery units, the lower plate being coupled to the pair of end plates.

9. A battery pack, comprising:
a plurality of battery modules, each battery module including:
a pair of end plates facing each other;
a plurality of battery units arranged in a first direction between the end plates;
a first side plate extending along a first side of the plurality of battery units, the first side plate being coupled to the end plates;
a second side plate extending along a second side of the plurality of battery units, the second side plate being coupled to the end plates and being disposed opposite to the first side plate; and
a plurality of coupling members, the plurality of coupling members coupling the side plates to at least one of the pair of end plates and including:
a first coupling member, the first coupling member coupling the one of the end plates to the first side plate; and
a second coupling member, the second coupling member coupling the one end plate to the second side plate, wherein:
the first coupling member and the second coupling member are disposed in asymmetrical positions with respect to a central line of the one end plate, and
each coupling member that couples the one end plate to the first side plate is asymmetrically disposed about the central line of the one end plate with respect to every coupling member that couples the one end plate to the second side plate.

10. The battery pack as claimed in claim 9, wherein each end plate includes:
a base plate disposed adjacent to the plurality of battery units;
a first flange part, the first flange part being bent from a first side of the base plate in a direction away from the plurality of battery units; and
a second flange part, the second flange part being bent from a second side of the base plate in a direction away from the plurality of battery units.

11. The battery pack as claimed in claim 10, wherein:
the first coupling member couples the first flange part to the first side plate, and
the second coupling member couples the second flange part to the second side plate.

12. The battery pack as claimed in claim 9, wherein the plurality of coupling members further includes:
a third coupling member further coupling the one end plate and the first side plate, together with the first coupling member; and
a fourth coupling member further coupling the one end plate and the second side plate, together with the second coupling member.

13. The battery pack as claimed in claim 12, wherein the first and third coupling members are arranged in asymmetrical positions about the central line of the one end plate with respect to the second and fourth coupling members.

14. The battery pack as claimed in claim 13, wherein the first, second, third, and fourth coupling members are arranged at first, second, third, and fourth heights that are different with respect to a third side perpendicular to the first and second sides.

15. The battery pack as claimed in claim 9, wherein the first and second coupling members:
include a bolt and a nut, and
couple the one end plate and the side plates with the bolt and the nut.

16. The battery pack as claimed in claim 9, further comprising:
an upper plate extending along a third side of the plurality of battery units, the upper plate being coupled to the pair of end plates; and
a lower plate extending along a fourth side of the plurality of battery units, the lower plate being coupled to the pair of end plates.

17. The battery pack as claimed in claim 9, wherein the plurality of battery modules are arranged in a second direction perpendicular to the first direction.

18. The battery pack as claimed in claim 17, wherein the plurality of battery modules arranged in the second direction are disposed such that the first and second coupling members are adjacent to and offset from each other.

19. The battery pack as claimed in claim 9, wherein the plurality of battery modules includes one set of battery modules arranged in a second direction perpendicular to the first direction and a second set of battery modules arranged in a third direction perpendicular to the first and second directions.

20. The battery pack as claimed in claim 19, wherein the second set of battery modules arranged in the third direction are disposed such that the first and second coupling members of respective battery modules adjacent to each other in the third direction are aligned.

* * * * *